United States Patent
Gruber

Patent Number: 5,160,561
Date of Patent: Nov. 3, 1992

[54] METHOD FOR WINDING A PLURALITY OF LENGTHS OF THERMOPLASTIC RESIN IMPREGNATED YARNS USING A HEATED GUIDE EYE

[75] Inventor: Mark B. Gruber, New Castle, Del.

[73] Assignee: E. I. Du Pont de Nemours and Company, Wilmington, Del.

[21] Appl. No.: 649,353

[22] Filed: Feb. 1, 1991

Related U.S. Application Data

[63] Continuation-in-part of Ser. No. 387,363, Jul. 19, 1989, abandoned, which is a continuation of Ser. No. 95,235, Sep. 11, 1987, abandoned.

[51] Int. Cl.⁵ .......................................... B65H 81/00
[52] U.S. Cl. .................................. 156/175; 156/173; 156/320; 156/322; 156/309.6
[58] Field of Search ............... 156/169, 172, 173, 175, 156/425, 433, 441, 296, 497, 322, 320, 309.6

[56] References Cited

U.S. PATENT DOCUMENTS

| | | | |
|---|---|---|---|
| 3,148,102 | 9/1964 | Eakins et al. | 156/161 |
| 3,687,762 | 8/1972 | McLarty | 156/296 X |
| 3,715,252 | 2/1973 | Fairbairn | 156/184 X |
| 3,946,100 | 3/1976 | Davis et al. | 264/211.15 |
| 4,010,054 | 3/1977 | Bradt | 156/187 X |
| 4,202,718 | 5/1980 | Mizutani et al. | 156/173 X |
| 4,549,920 | 10/1985 | Cogswell et al. | 156/441 X |
| 4,610,402 | 9/1986 | Corbett et al. | 242/157 R X |
| 4,975,321 | 12/1990 | Gentile et al. | 428/294 |

FOREIGN PATENT DOCUMENTS 0265915 5/1988 European Pat. Off. ............ 156/173

*Primary Examiner*—Jeff H. Aftergut

[57] ABSTRACT

A consolidated structure with less than 6 percent void content is formed from a plurality of thermoplastic impregnated yarns traverse wound on a rotating mandrel by feeding the yarns under tension simultaneously from a source of supply to a traversing carriage as adjoining flat tapes. The tapes then move successively through a preheating section, a heated circular guide and a contact point heating source, all on the carriage, before being laid down in a predetermined path on the mandrel.

1 Claim, 5 Drawing Sheets

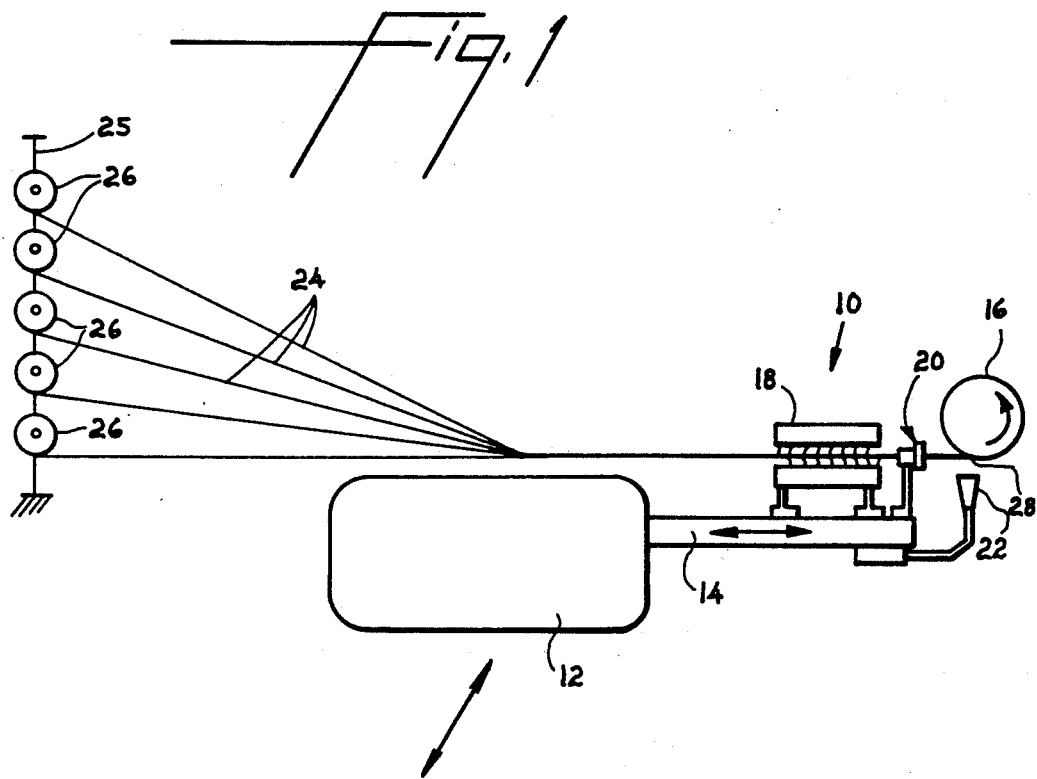
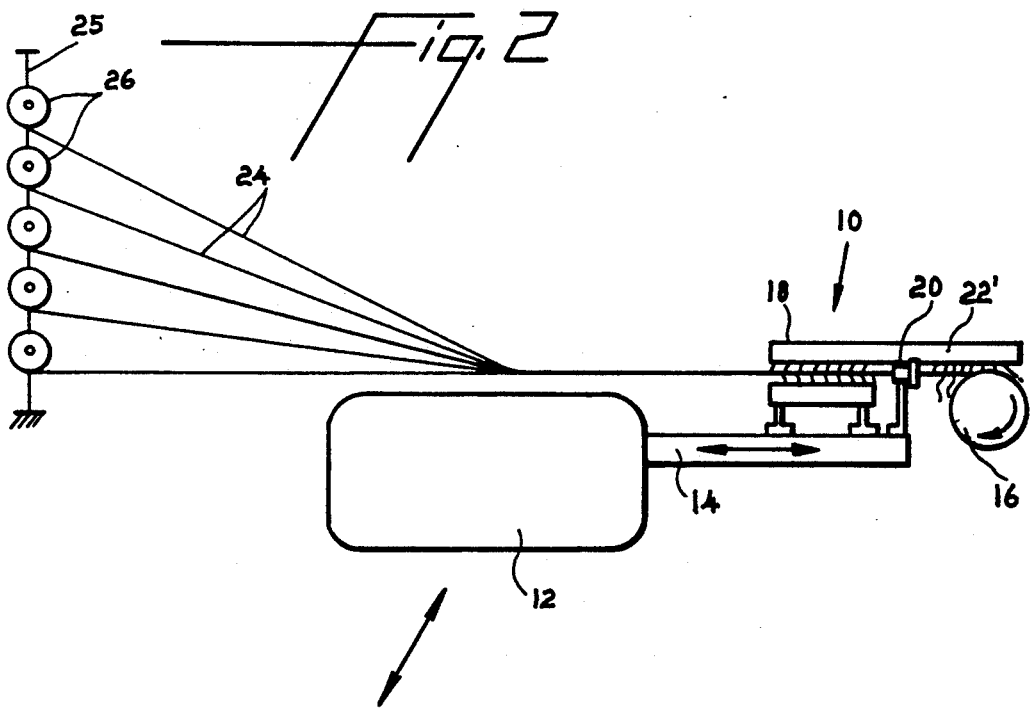

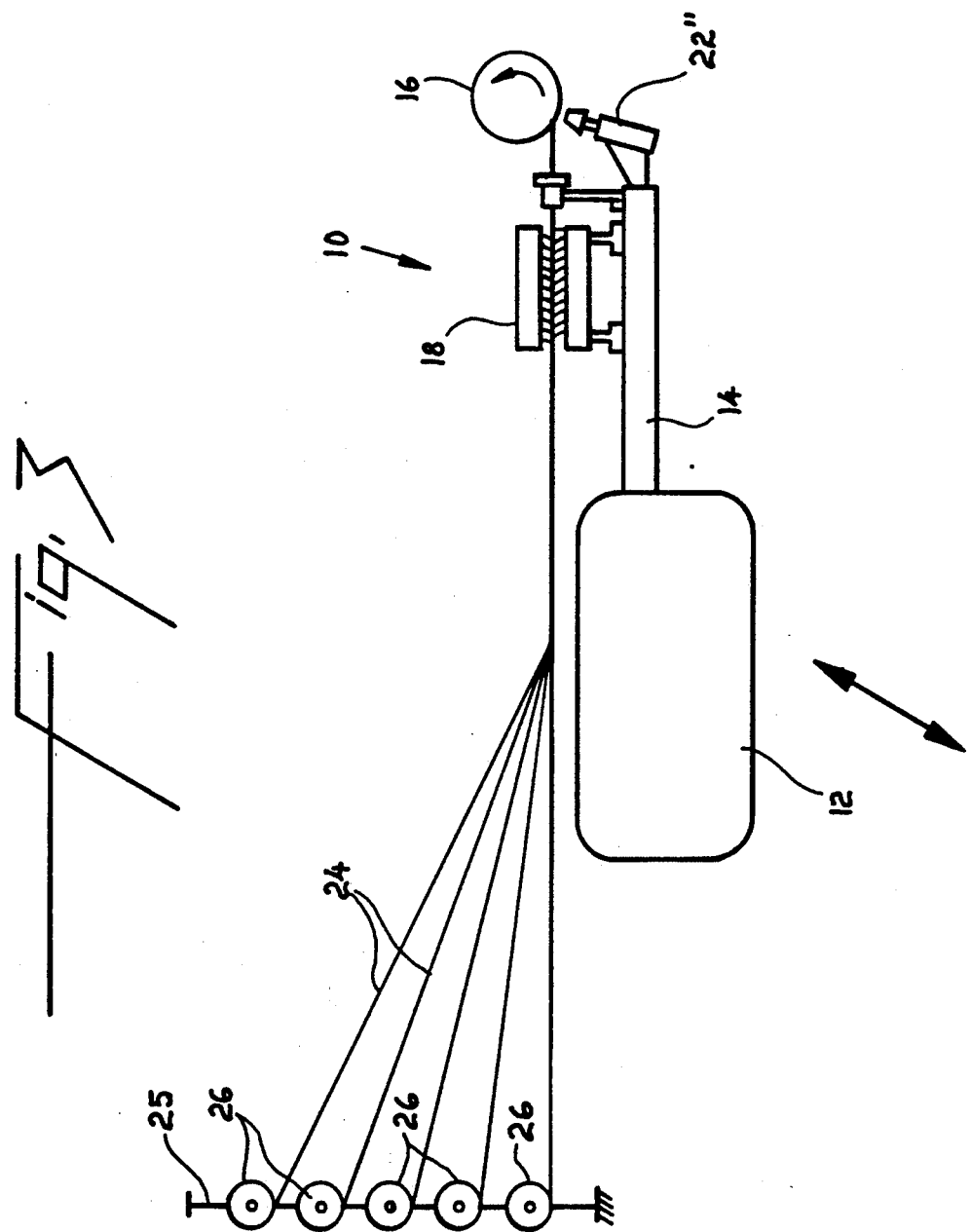

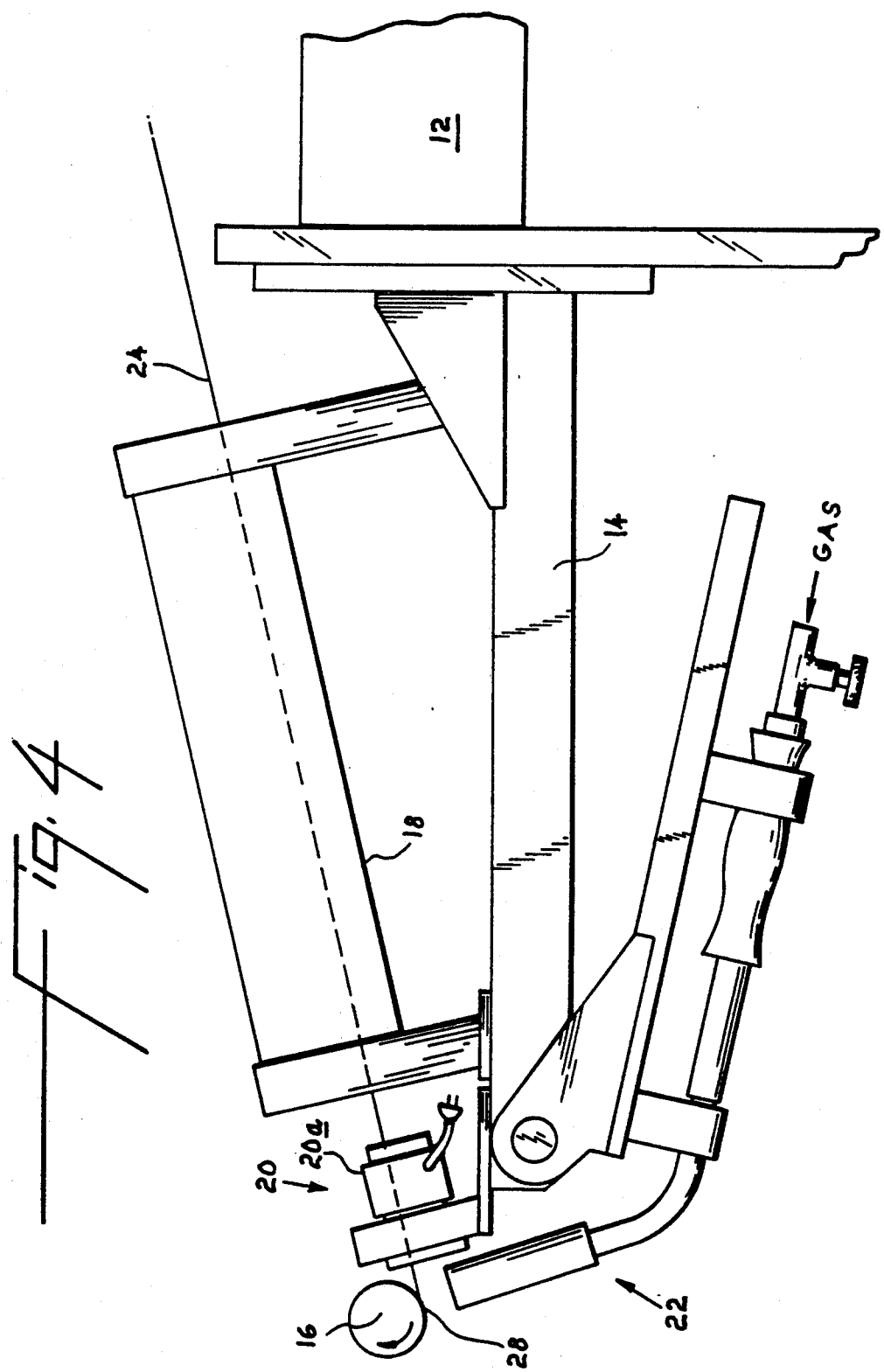

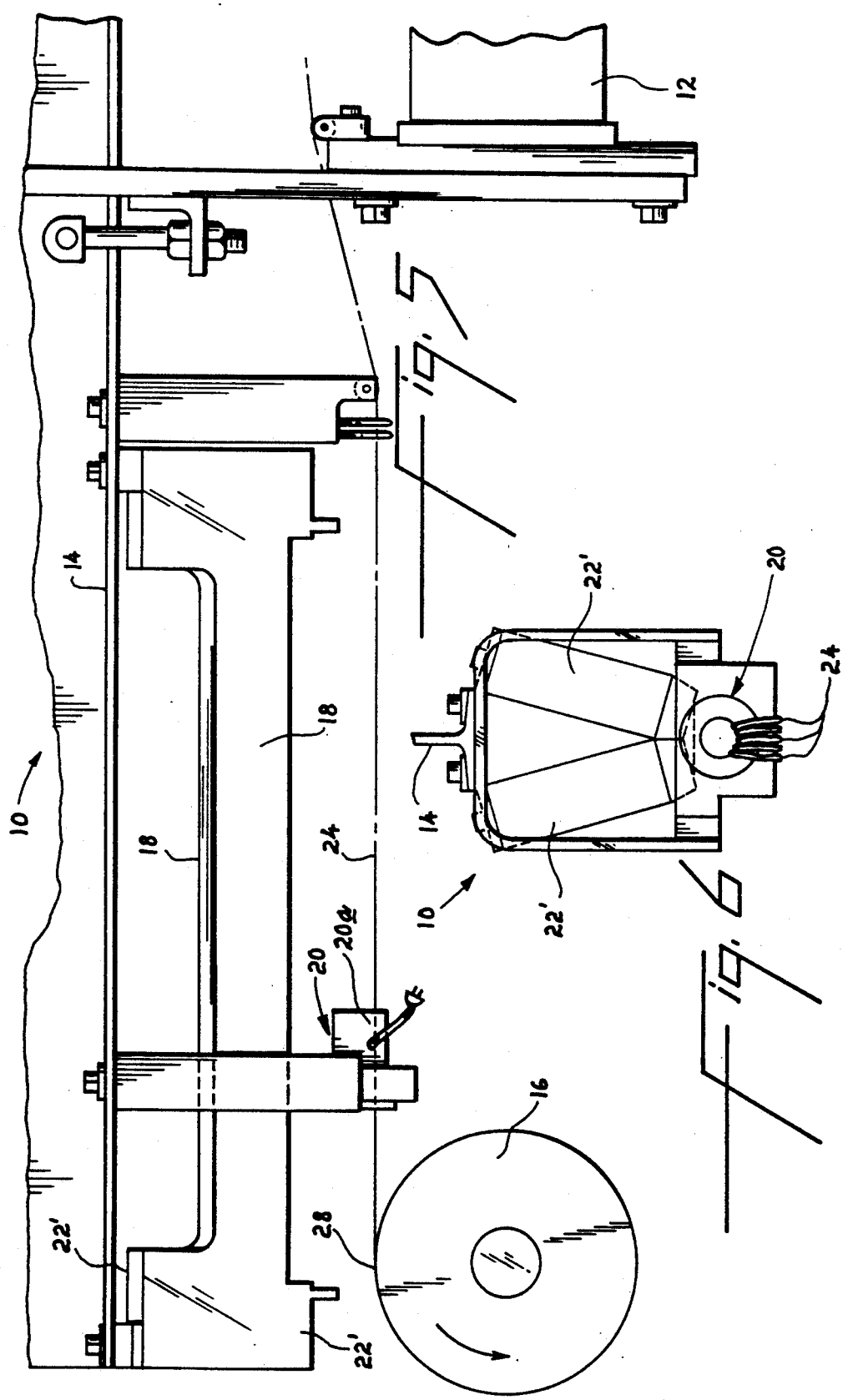

METHOD FOR WINDING A PLURALITY OF LENGTHS OF THERMOPLASTIC RESIN IMPREGNATED YARNS USING A HEATED GUIDE EYE

CROSS REFERENCE TO RELATED APPLICATION

This application is a continuation-in-part of prior application Ser. No. 07/387,363 filed Jul. 19, 1989, now abandoned, which in turn is a continuation of prior application Ser. No. 07/095,235 filed Sept. 11, 1987 and now abandoned.

BACKGROUND

This invention relates to winding fiber-reinforced resin products, and more particularly it relates to winding a plurality of lengths of thermoplastic resin impregnated yarns to form an insitu consolidated product.

Equipment for winding single length thermoplastic resin impregnated yarn on a mandrel is known. However, fabrication of parts in this manner is slow and costly because only one impregnated length of yarn is wound at low speed. When scale-up has been attempted, the control of multiple lengths of such yarns during winding at higher speeds above 10 ft./min. presented barriers because heating the resin to its melt temperature during winding caused sticking of the polymer to guides, loss of control of band width and fuzzing of the yarn. This resulted in unacceptable operability as well as broken filaments which gave poor mechanical properties. In addition, the inability to get enough heat into a multi-end system to melt the polymer always produced parts with an unacceptable level of voids unless the product was subject to a post heating treatment. Furthermore, these limitations have deprived end users of the lower cost improved products which could be obtained from thermoplastic resin impregnated yarn.

SUMMARY OF THE INVENTION

According to the present invention, an insitu consolidated composite structure (i.e., the ability to consolidate the structure during winding of the structure without the need of consolidation processing after winding) is built from a plurality of lengths of thermoplastic resin impregnated yarns or tape wound simultaneously on a mandrel wherein multiple ends of such yarns are fed at high speeds (above 10 ft./min.) under controlled tension in the range of 5% to 50% of the ultimate tensile strength of the yarn from a supply source to a traversing carriage of a filament winder as a flat uniform tape. This tape then moves through the "head" portion of the filament winder containing a preheating section, a heated guide, and a contact point heating source before being laid down in a predetermined helical or geodesic path on a rotating mandrel.

The head of the filament winder is mounted on the end of the carriage feed arm which can move in and out compensating for changes in cross-section of the rotating mandrel. Infra-red (IR) strip heaters are mounted on the head to preheat the multi-end impregnated yarn and are designed in length and intensity to bring thermoplastic resin to within ±10° C. of its melt or processing temperature. The pre-heated impregnated yarn then passes across a heated guide that is maintained at a temperature above the melt temperature but below the degradation temperature of the thermoplastic resin, and located as close as possible to the surface o the part being wound. The heating of the guide is critical to preventing polymer and fiber buildup on its surface at high speeds of 25 ft./min. and above, and the location is critical to maintaining impregnated yarn temperature until the impregnated yarn reaches the laydown point.

Mounted at the forward most portion of the head is a contact point heating source which maintains the surface temperature of the part high enough, through induced heating of the mandrel and direct heating of the wound surface, to ensure molten mating surfaces at the laydown point of the incoming lengths of impregnated yarn. Hot air, open flame, and IR contact point heating sources may be used. The selection of which source to use is dependent on the yarn, the thermoplastic resin, the mandrel design, and operating speed.

Upon completion of the winding process all heat sources are removed and the part is allowed to cool. After reaching room temperature the part may easily be extracted from the mandrel and an insitu consolidated part with less than 6% void content requiring no post-consolidation steps results.

BRIEF DESCRIPTION OF THE DRAWINGS

FIG. 1 is a schematic side view of a winding apparatus for practicing the invention.

FIG. 2 is a schematic side view of an alternate embodiment of FIG. 1

FIG. 3 is a schematic side view of another embodiment of FIG. 1.

FIG. 4 is a side view of the head of the winding apparatus shown schematically in FIG. 1.

FIGS. 5 and 6 are side and front views respectively of the head of the winding apparatus shown schematically in FIG. 2.

DETAILED DESCRIPTION OF THE ILLUSTRATED EMBODIMENTS

Figure 7:
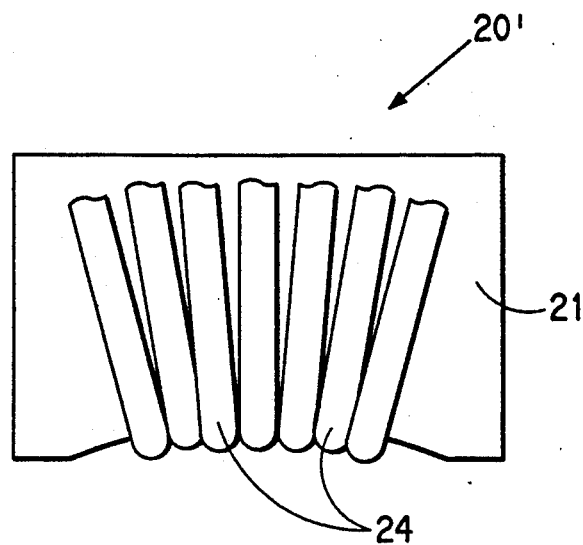
FIGS. 7 and 8 are front and side views, respectively, of an alternate heated guide useful in the apparatus of this invention.

In FIGS. 1-3, the yarn-laying head used inpracticing the invention is generally designated by the numeral 10 and is shown to include a traversing carriage 12 upon which is mounted a feed arm 14 movable toward and away from a rotating mandrel 16. The traversing carriage, feed arm, and mandrel are a model W60-16 triple axis filament winder with and N-210 computer by McClean Anderson of Milwaukee, Wisc. Mounted to the feed arm 14 are infra-red heaters 18, i.e. a first heating source, a heated guide 20, i.e. a second heating source, and an open flame heater 22, i.e. a third heating source (FIG. 1).

As carriage 12 is traversed longitudinally of mandrel 16 a plurality of lengths of thermoplastic resin impregnated yarns 24 are pulled from a plurality of supply packages 26 mounted on rolling takeoff creel 25 against a desired level of back tension (in the range of 5% to 50% of the ultimate tensile strength of the tape) applied by a mechanism (not shown) associated with the creel for controlling unwind tension on packages 26 such as a Type 800C012 tension compensator by Compensating Tension Controls, Inc., of West Caldwell, N.J.

As the yarn-laying head moves with respect to the structure being wound on mandrel 16, the thermoplastic resin impregnated lengths of yarn 24 are exposed to radiant heaters 18 (model 5535 manufactured by Research Inc. of Minneapolis, Minn.). In these heaters, the thermoplastic resin is heated to a temperature that is within 10° C. of its melt temperature. The lengths of yarn then pass through a heated guide 20 which in the preferred embodiment is a circular eye made of aluminum with a hard anodized finish coated with Teflon ®. The guide is wrapped with an electrically operated band heater 20a (such as an MI band heater model MBIEIJNI) which raises the temperature of the thermoplastic to a temperature above its melting point but below its degradation temperature which should be understood to be below the melting point of the reinforcing fibers. Mounted at the forward end of feed arm 14 is an open flame heater 22 (a Vulcan Universal propane torch with a No. 3 tip) over which the tapes 24 pass to the laydown location 28 on the mandrel 16. This heater heats the surface of the part being wound on the mandrel, through induced heating of the mandrel and direct heating of lengths of yarn 24 as they travel from the guide 20 to location 28 to ensure molten mating surfaces at laydown location 28.

In FIG. 2, the third heating source, the open flame heater 22 is replaced with an infra-red heater 22' (model 5535 by Research Inc.), and in FIG. 3 flame heater 22 is replaced with a hot air gun heater 22" (Serpentine VI model CHE128767 by Sylvania).

FIGS. 4, 5 and 6 show the physical relationship of the tapes, the heaters and heated guide on the head of the filament winder with respect to each other and the mandrel.

Figure 8:
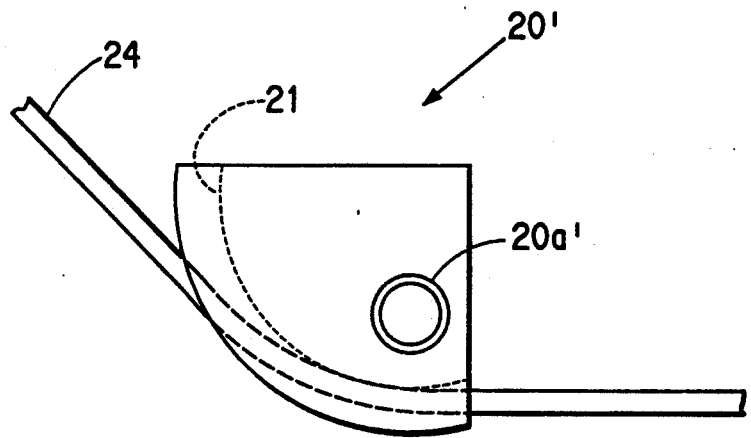

An alternate embodiment for guide 20 is shown in FIGS. 7 and 8. More particularly, this guide 20' has a concave radiused surface 21 which guides the tows 24 and embedded in the guide body 23 is a calrod heating element 20a'.

Void Content

To determine void content in a composite sample, the density of the sample must be measured and the density of a zero void sample must be calculated. From these two numbers, the void content of the sample can be determined. Measurement of sample density: The density of the samples were measured using ASTM D 792-66 standard test method. The following procedures were followed:

1) Weigh sample in air (a)
2) Weigh sample in water (b)
3) Calculate the specific gravity (s.g.) of the sample s.g.=a/(a−b)
4) Calculate the density of Measured density=s.g.× density of water at the measurement temperature.

Theoretical density for a sample with no voids:

$$Dc = (Df \times Vf) + (Dm \times Vm)$$

where:
Dc=density of the composite
Df=density of the fiber
Dm=density of the matrix
Vf=fiber volume
Vm=matrix volume
Calculate the % void content:

$$\% \text{ voids} = \frac{(\text{Theoretical density} - \text{measured density})}{\text{theoretical density}} \times 100$$

EXAMPLE I

A tow of Owen Corning's Type 30 continuous glass filaments having approximately 6620 denier and 2000 filaments is coated with PETG thermoplastic polymer (a copolymer manufactured by Eastman Kodak Company) using a melt-injection process (as described in U.S. Pat. No. 4,640,861) to approximately 50% by volume coating level. Four bobbins of the coated tow of these glass filaments are mounted on a rolling take-off creel equipped with a mechanism for controlling unwind tension (Type 800C012 Tension Compensator made by Compensating Tension Controls, Inc.). The tow is advanced at 30 ft./min. by means of a rotating mandrel downstream and a tension of approximately 3500 gm is applied to the moving tow by the tension compensator. The moving tow passes through the "head" portion of the downstream filament winder which contains (1) a pre-heating section (heated with an infrared heater) which heats the tow to 260° C. followed by (2) a guide-eye which is preheated to 200° C. with bandheaters and (3) a hot air source which is positioned close to the rotating mandrel (6 cm away) and maintains the temperature of the tow at 200° C. The tow is finally laid down on an electrically heated mandrel (maintained at 250° C.). The computer controlled winder is preprogrammed to provide a 12" long tube with 45° winding angle. After completing the winding, the mandrel and the tube are cooled for approximately 1 hour until the temperature of the part is about 100° C. The wound tube is then removed, cut-up and tested for void content.

The filament winder used is a commercial winder made by McClean Anderson Model No. W-60 which was modified to adapt to this work as follows:
The thermoset resin bath was removed,
The thermoplastic head was mounted on the cross feed and power, water and N2 was supplied to the carriage for a thermoplastic head.

The void content of the tube was 4.8%.

EXAMPLE II

A tow of Hercules AS4 continuous graphite filaments having approximately 3000 filaments is coated with a certain amorphous copolyamide polymer (as described in U.S. Pat. No. 4,681,411) using a melt-injection process (as described in U.S. Pat. No. 4,640,861) to approximately 50% by volume coating level. Two bobbins of the coated tow of these graphite filaments are mounted on two rolling take-off creels equipped with a mechanism for controlling unwind tension (Type 800C 012 Tension Compensator made by Compensating Tension Controls, Inc.). The tow is advanced at 25 ft./min. by means of a rotating mandrel downstream and a tension of approximately 1500 gm is applied to each moving tow by the tension mechanism. The moving tow passes through the "head" portion of the downstream filament winder which contains: (1) A pre-heating section (heated with an infrared heater) which heats the tow to 320° C. following by, (2) A guide eye which is preheated to 320° C. with band heaters and, (3) An infrared heating source which is positioned close to the rotating mandrel (3 cm away) and maintains the temperature of the yarn at 320° C. (4) The tow is finally laid down on an electrically heated mandrel (at 220° C.).

Hot N2 (320°) was blown into the I.R. heatup zone to reduce polymer degradation. The computer controlled winder is preprogramed to produce a 6 ft long tube with +45°/+5°/90°/+45°/90°/+45°/90° winding angles.

After completing the winding, the mandrel and the tube are cooled for approximately 1 hour until the temperature of the part is about 100° C. The wound part is removed and tested for void content. The void content was 2.5%.

EXAMPLE III

A tow of Kevlar® 49 continuous filaments having approximately 1000 filaments is coated with a certain amorphous copolyamide polymer (as described in U.S. Pat. No. 4,681,411 using a meltinjection process (as described in U.S. Pat. No. 4,640,861) to approximately 75% by volume coating level.

Four bobbins of the coated tow of these Kevlar® 49 filaments are mounted on four rolling take-off creels equipped with a mechanism for controlling unwind tension (Type 800C 012 Tension Compensator made by Compensating Tension Controls, Inc.). The tow is advanced at 185 ft./min. by means of a rotating mandrel downstream and a tension of approximately 1500 gm is applied to each moving tow by the tension mechanism. The moving tow passes through the "head" portion of the downstream filament winder which contains: (1) a pre-heating section (heated with an infrared heater) which heats the tow to 320° C. followed by, (2) a guide eye which is preheated to 325° C. with tank heaters and, (3) an open flame heater which is positioned close to the rotating mandrel (3 inches away) and maintains the temperature of the yarn at 320° C., and (4) the tow is finally laid down on a steel mandrel.

The computer controlled winder is preprogrammed to produce a 12 inch long by 13.5 inch diameter part with all 90 wind angles.

After completing the winding, the mandrel and the tube are cooled for approximately 1 hour until the temperature of the part is about 100° C. The wound part is removed and tested for void content. The void content was 2.2%.

What is claimed is:

1. A method of building and consolidating a composite structure from a plurality of tows of thermoplastic resin reinforced with yarn comprising: the steps of advancing a plurality of lengths of said tows under tension from a source of supply to a laydown location on a rotating mandrel at speeds of 25 ft./min. and above; guiding said lengths in a helical path by means of a circular eye guide axially traversing said mandrel to form said structure, said thermoplastic resin having a melt temperature and a degradation temperature, said lengths advancing from said source of supply successively through a first heating source to heat said lengths from above said melt temperature to below said degradation temperature, then through said guide; heating said guide by means of an electrically energized band heater wrapped around said guide to a temperature in a range of from above the melt temperature to below the degradation temperature of said thermoplastic resin, whereby said thermoplastic resin does not stick to said circular eye guide and said yarn does not fuzz after passing through said circular eye guide at winding speeds of 25 ft./min. and above; and heating said surface of said structure at said laydown location with a third heating source to ensure molten mating surfaces at said laydown location.

* * * * *